United States Patent [19]

Monk

[11] 4,060,684

[45] Nov. 29, 1977

[54] PROCESS FOR RECOVERING RAW MATERIALS FROM WASTE CELLOPHANE

[75] Inventor: Donald Wayne Monk, Brevard, N.C.

[73] Assignee: Olin Corporation, Pisgah Forest, N.C.

[21] Appl. No.: 719,657

[22] Filed: Sept. 1, 1976

[51] Int. Cl.² ............................................. C08B 9/08
[52] U.S. Cl. ..................................... 536/56; 260/2.3; 264/37; 536/57
[58] Field of Search ............... 536/56, 57, 40; 264/37, 264/38; 260/2.3

[56] References Cited

U.S. PATENT DOCUMENTS

| 1,994,591 | 3/1935 | Reid ........................................ 536/40 |
| 2,070,027 | 2/1937 | Reid ........................................ 536/40 |
| 2,337,928 | 12/1943 | Reichel ................................... 536/57 |
| 3,758,457 | 9/1973 | Broeck et al. ........................... 536/56 |
| 3,873,314 | 3/1975 | Woo et al. ............................. 96/50 R |
| 3,884,907 | 5/1975 | Laurance et al. ...................... 536/57 |

FOREIGN PATENT DOCUMENTS

1,357,675  6/1974  United Kingdom.

OTHER PUBLICATIONS

TAPPI, July 1974, vol. 57, No. 7, pp. 56–60, (Eng).

*Primary Examiner*—Ronald W. Griffin
*Attorney, Agent, or Firm*—Robert W. Habel

[57] ABSTRACT

An efficient process for recovering raw materials from scrap coated and uncoated cellophane, including usable cellulose, coating resin, and softener, comprising (a) shredding the scrap cellophane, (b) extracting softener and coating resin jointly by washing the shredded film with a tetrahydrofuran solution containing from 2 to 15% by weight water in an extractor, (c) removing the spent wash solution containing softener, coating resin, tetrahydrofuran, and water and rapidly evaporating tetrahydrofuran therefrom while allowing the coating resin to inherently precipitate from the softener, (d) drying the shredded cellophane after removal of the spent wash solution to recover retained tetrahydrofuran and pure cellulose, (e) recycling tetrahydrofuran obtained from the flash evaporating and drying steps to the extractor, and (f) separating the precipitated coating resin from the softener. The recovered cellulose can be used in many ways, such as recycled directly back into the process for the manufacture of cellophane. Recovered softener and coating resin are also suitable for reuse in the production of cellophane.

8 Claims, 1 Drawing Figure

PROCESS FOR RECOVERING RAW MATERIALS FROM WASTE CELLOPHANE

BACKGROUND OF THE INVENTION

This invention relates generally to the recovery of raw materials from regenerated cellulose film and more particularly to the recovery of cellulose, softener, and coating resins from softened and coated cellophane scrap and waste.

In the production of regenerated cellulose films such as cellophane, there are a number of stages in the process where waste or scrap materials are produced such as edge trimmings and ends, in addition to downgraded or off-quality film that cannot be used. Recovery of cellulose from such waste cellophane has been a need of the industry for years and processes have been developed to separate the raw materials that make up the film for recycling. However, this is difficult because the cellulose cannot be easily recovered due to the various softeners and coatings applied to the film during its manufacture. Cellophane, produced according to the viscose process, involves converting cellulose pulp to cellulose xanthate which is dissolved in a caustic soda solution to obtain viscose. The viscose is then forced through an elongated orifice as a continuous sheet into a coagulating bath where a coherent web is formed which is subsequently regenerated, washed, desulfured, and bleached. The resulting web is then softened by passng it through a tank containing an aqueous solution of a plasticizer or softener such as ethylene glycol, glycerin, propylene glycol, or urea, and dried to a moisture content of about 4 to 10%. Thereafter a moistureproof coating is applied to both sides of the film. Such moistureproof coatings may be comprised of nitrocellulose or polyvinylidene chloride (saran), depending upon the end use for the film. In some cases, the film is left uncoated for those applications in which moistureproofing is not desired. In any event, during the processing and slitting of the film, trimmed waste and scraps are produced as well as film of inferior quality which cannot be used for its intended purpose.

There are several known processes that have been developed to recover the basic materials from such waste and scrap cellophane. However, none are economically realistic due to the complexity and multiplicity of steps required in order to separate the various components from one another. For example, U.S. Pat. No. 2,337,928 discloses a process for recovering waste material resulting from the manufacture of moistureproof regenerated cellulose film in which the moistureproof coating is first extracted from the film with a solvent mixture of toluene and butyl acetate in order to separately recover the moistureproof composition, then the remaining material is extracted with a solvent for the softening agent in the film to separately recover the softening agent, and then the resulting material is finally treated to recover the cellulose in relatively pure form. Another process is disclosed in U.S. Pat. No. 3,758,457 which, inter alia, involves humidifying comminuted cellulose scrap by adding water in order to swell the cellulose, extracting the water and softener from the humidified comminuted cellulose by flushing it with an extraction agent, drying the coated comminuted cellulose to remove the softener extracting agent, removing the coating from the comminuted cellulose by flushing it with a coating solvent, followed by adding water and more coating solvent to the comminuted cellulose to form a slurry and drying the slurry of water, coating solvent, and comminuted cellulose with a stream of gas to selectively remove the coating solvent leaving dried comminuted cellulose. As is evident, both of these processes are very complex and involve the utilization of two different solvents, one for the softener and the other for the coating resins, in order to recover the cellulose. Also, recovery of the softener from its solvent and the coating resin from its solvent is difficult. From a practical standpoint, none of the prior art processes have proved satisfactory for various reasons, primarily because none are economically feasible. Moreover, they are not readily adaptable to cellophane scrap bearing different coatings or softeners so as to enable the recovery of raw materials from uncoated, nitrocellulose coated, or polyvinylidene chloride coated cellophane, much less the recovery of the various types of softeners that may be used during the production of such film.

SUMMARY OF THE INVENTION

Accordingly, it is an object of this invention to provide a process for recovering raw materials from coated or uncoated regenerated cellulose film that is efficient and economical. Another object of this invention is to provide a process for separating and recovering the coating resin, softener, and cellulose from scrap and waste cellophane in a minimum number of steps utilizing a single extraction agent for both the coating resin and softener. Still another object is to provide a process for recovering cellulose from scrap cellophane in a form suitable for recycle back into the viscose process.

These and other objects of the invention are accomplished by a process for recovering raw materials from scrap cellophane comprising (a) shredding the cellophane, (b) extracting both softener and coating resin by washing the shredded cellophane with a tetrahydrofuran solution containing from 2 to 15% by weight water, (c) removing the spent wash solution containing softener, coating resin, tetrahydrofuran, and water and rapidly evaporating the tetrahydrofuran therefrom while concurrently allowing the coating resin to inherently precipitate from the softener, (d) drying the shredded cellophane to remove retained tetrahydrofuran and recovering the purified cellulose, (e) recycling tetrahydrofuran obtained from the evaporating and drying steps to the extractor and (f) separating the precipitated coating resin from the softener to recover both for reuse.

Because tetrahydrofuran is a solvent for both the cellophane softener and the coating resin, both of these materials are extracted simultaneously from the shredded cellophane using a single extracting agent. It is essential that the tetrahydrofuran contain a small percentage of water, for example 2 to 15% by weight and preferably 5 to 10%, since it has been found that this amount of water assists tremendously in extracting the softener from the cellophane and is required to remove the last traces of softener from the shredded material. After extraction, the solvent is drained from the shredded cellophane and the wash cycle may be repeated using a second batch of solvent solution to remove all traces of softener and coating resin if a very pure recovered cellulose product is desired. In either case, extraction may be carried out by any well known means such as countercurrent or a batch technique with agitation to assure good contact between the cellophane and solvent. The shredded cellophane is slurried with the solvent solution in a ratio of from 8 to 12 times by weight solvent to cellophane. A ratio of 9 or 10 to 1 is preferred for maximum extraction and minimum use of solvent. The cellophane that remains after final extraction is dried and the tetrahydrofuran recovered and recycled to the extractor. The dried cellophane is pure cellulose containing from 2 to 10% moisture and is suitable for reuse along with conventional cellulose to make more cellophane according to the viscose process.

The spent tetrahydrofuran wash solution is subjected to rapid evaporation such as flash evaporation to recover the tetrahydrofuran which is recycled to the extractor. As the tetrahydrofuran evaporates from the spent wash solution, the coating resin precipitates since it is not soluble in the softener or plasticizer that remains in solution. Because of this phenomenon, the liquid softener is very easily separated from the solid coating resin precipitate allowing concomitant recovery of both of these materials along with the purified cellulose. Thus, the invention allows recovery of the basic materials in coated cellophane and accomplishes the separation of cellulose, softener, and coating resin in essentially only two steps, extraction and flash evaporation.

BRIEF DESCRIPTION OF THE DRAWING

In order that the invention may be more readily understood and carried into effect, reference is made to the accompanying drawing and description thereof which are offered by way of illustration only and not in limitation of the invention, the scope of which is defined by the appended claims rather than any description preceding them.

In the drawing.

DETAILS OF THE INVENTION

Figure 1:
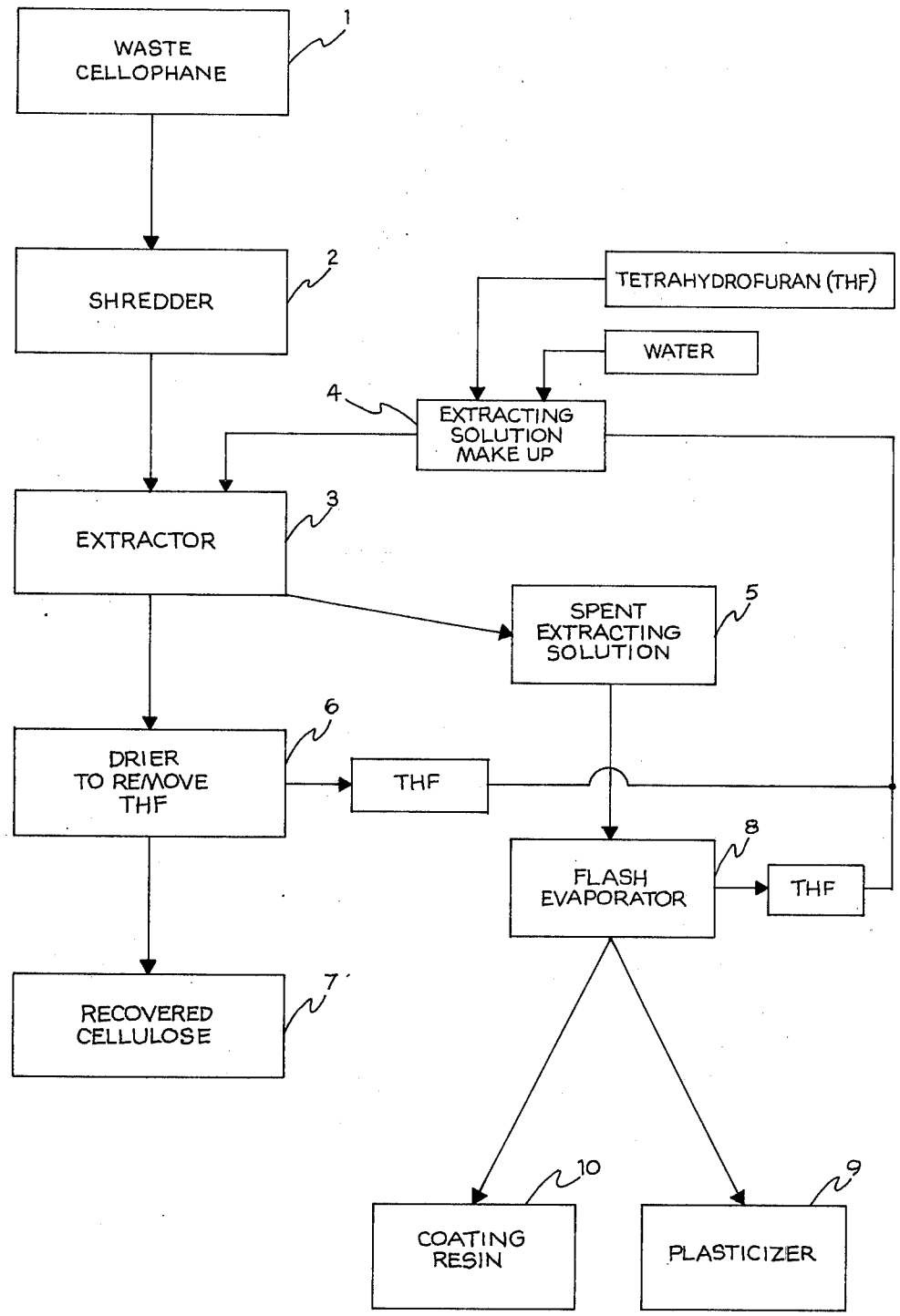
FIG. 1 is a block diagram showing the material flow and various steps of the process.

Referring to the drawing, uncoated and coated cellophane 1, comprising scrap, edge trimmings, ends, and inferior quality film, is passed to a knife and screen shredder 2 where the combined material is shredded to approximately 5- to 30-mesh flake. While the process works equally well with either nitrocellulose or polyvinylidene chloride (saran) coated cellophanes, it is advantageous to use only one type of coated film at a time and thereby avoid obtaining a mixture of coating resins in the subsequent coating recovery step in the process. However, if it is not desired to obtain a single coating resin from the process, then a mixture of nitrocellulose and saran coated cellophane scrap can be employed. Likewise, only cellophane scrap softened with common plasticizers should be used. Otherwise, a mixture of softeners in the subsequent softener recovery step will result. Uncoated cellophane may be blended with the coated scrap depending upon the scrap available without affecting the efficiency of the process. Here again, the plasticizer used to soften the uncoated film should be the same as that used for the coated film if mixtures in the softener recovery step are not desired.

Batch extractor 3 is charged with a quantity of the shredded cellophane and tetrahydrofuran extracting solution from makeup station 4 in a weight ratio of 1 part cellophane to 8–12 parts extracting solution. The tetrahydrofuran solution is made up to contain 5 to 10% water by weight of the total solution. The slurry of cellophane and tetrahydrofuran solution is agitated in extractor 3 for approximately twenty minutes at ambient temperature, after which the spent solution is drained off into holding tank 5. A second wash cycle may be repeated identical with the first. The cellophane flake remaining after the final extraction is then passed to drier 6 from which residual tetrahydrofuran is removed and recycled back to the extraction solution makeup station 4. The dried cellophane thus obtained at stage 7 is pure cellulose containing approximately 2 to 10% water.

The spent extracting solution retained in holding tank 5 is transferred to flash evaporator 8 wherein tetrahydrofuran is flashed off and recycled to the extraction solution makeup station 4. As the tetrahydrofuran is removed from the spent wash solution, the coating resin, which may be either nitrocellulose or saran, precipitates since they are insoluble in any of the conventional plasticizers used to soften cellophane, such as ethylene glycol, glycerin, or propylene glycol. After all the tetrahydrofuran is flashed off, the liquid plasticizer 9 is filtered from the precipitated coating resin 10 and the two thus separated for whatever further use is desired of them.

EXAMPLE

Fifty parts by weight of scrap 140-gauge saran coated cellophane cut sufficiently fine to pass through a 10-mesh sieve was added to a mixture of 418 parts by weight of tetrahydrofuran and 32 parts by weight of water in an extraction vessel that permitted the mixture to be agitated. The cellophane flakes were dispersed uniformly throughout the tetrahydrofuran/water mixture as individual particles free of any agglomerates. This slurry was agitated at 25° C permitting the tetrahydrofuran/water mixture to dissolve the saran coating and to extract the base sheet softeners, propylene glycol, and glycerin. After 15 minutes, the tetrahydrofuran/water extraction solution was drained from the slurry and the extraction vessel charged with a second tetrahydrofuran/water mixture and the extraction cycle repeated. After extraction, the extraction solution was again drained from the slurry, leaving cellophane flakes completely free of saran coating and base sheet softeners. The composition of cellophane flakes at this point comprised 34.5 parts by weight of cellulose, 35.0 parts by weight of tetrahydrofuran, and 5.6 parts by weight of water. The extracted cellulose was charged to a commercial Stokes vacuum dryer, where 34.4 parts of weight of tetrahydrofuran and 1.8 parts of weight of water were recovered and held for recycle. The dried cellulose had the composition of 34.5 parts by weight of cellulose, 3.8 parts by weight of water, and less than 0.1 parts by weight of tetrahydrofuran. Spent extraction solution containing 383.5 parts by weight of tetrahydrofuran, 6.2 parts by weight of softener (propylene glycol and glycerin), 5.3 parts of weight of saran coating, and 25.9 parts by weight of water was charged to a standard commercial flash evaporator. Because of the large difference in boiling points between tetrahydrofuran (65° C) and the lowest boiling softener (189° C), the tetrahydrofuran was removed very quickly and 381 parts by weight of tetrahydrofuran and 16.3 parts by weight of water were recovered for reuse in the extraction of the next batch of film. As the tetrahydrofuran was removed from the spent extraction solution, the saran coating selectively precipitated as a finely divided resinous material. After evaporation of the tetrahydrofuran, the solid saran coating and liquid softener mixture remaining were easily separated by filtration to yield a saran resin containing 5.3 parts by weight saran, 1.1 parts by weight of water, 2.5 parts by weight of tetrahydrofuran, and 0.2 parts by weight of softener. The liquid softener mixture contained 6.0 parts by weight of softener and 8.5 parts by weight of water, and was suitable for use directly in the softener bath on the cellophane casting machine.

It will thus be apparent from the foregoing description that the use of tetrahydrofuran as the sole extracting agent in the unique combination of steps according to this invention provides an efficient and economical process for effectively separating the basic components of coated cellophane to yield a pure cellulose that can be recycled for use in the viscose process as well as enabling recovery of the coating resin and plasticizer. The preferred embodiments are only illustrative and many variations and modifications may be resorted to without departing from the spirit and scope of the invention, as those skilled in the art will readily understand.

What is claimed is:

1. A process for recovering usable materials from scrap cellophane softened with a plasticizer and bearing a moistureproof coating resin comprising:
    a. shredding the cellophane to form a relatively fine flake;
    b. extracting both plasticizer and coating resin by washing the cellophane flake with an aqueous solution of tetrahydrofuran containing from 2 to 15% by weight water;
    c. removing the spent wash solution containing plasticizer, coating resin, tetrahydrofuran, and water and rapidly evaporating the tetrahydrofuran therefrom while concurrently allowing the coating resin to precipitate; and
    d. drying the extracted cellophane flake to remove retained tetrahydrofuran and recovering the purified cellulose.

2. The process of claim 1 in which the tetrahydrofuran obtained from said evaporating and drying steps is recycled to the extracting step and the remaining precipitated coating resin and the liquid plasticizer are separated and recovered for reuse.

3. The process of claim 1 in which the cellophane is shredded to flake that will pass through a screen ranging in size from 5 to 30 mesh.

4. The process of claim 1 in which the cellophane scrap has been softened with a plasticizer selected from the group consisting of ethylene glycol, glycerin, propylene glycol, and urea.

5. The process of claim 1 in which the cellophane has a moisture proof coating selected from the group consisting of nitrocellulose and polyvinylidene chloride.

6. The process of claim 1 in which the tetrahydrofuran wash solution contains 5 to 10% by weight water.

7. The process of claim 1 in which one part by weight cellulose flake is extracted with from about 8 to 12 parts by weight tetrahydrofuran wash solution.

8. The process of claim 7 in which the ratio of cellulose flake to wash solution is one part to about 8 to 9 parts by weight, respectively.

* * * * *